United States Patent
Hasegawa et al.

(10) Patent No.: US 10,297,057 B2
(45) Date of Patent: May 21, 2019

(54) IMAGE PROCESSING DEVICE AND IMAGE PROCESSING METHOD WHICH PROCESS AN IMAGE BASED ON HISTOGRAM DATA IN THE IMAGE

(71) Applicant: PANASONIC INTELLECTUAL PROPERTY MANAGEMENT CO., LTD., Osaka (JP)

(72) Inventors: Yuu Hasegawa, Fukuoka (JP); Akihiro Furuta, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/120,564

(22) PCT Filed: Feb. 25, 2015

(86) PCT No.: PCT/JP2015/000945
§ 371 (c)(1),
(2) Date: Aug. 22, 2016

(87) PCT Pub. No.: WO2015/129259
PCT Pub. Date: Sep. 3, 2015

(65) Prior Publication Data
US 2017/0018105 A1    Jan. 19, 2017

(30) Foreign Application Priority Data

Feb. 28, 2014 (JP) ................................ 2014-039447
Feb. 3, 2015 (JP) ................................ 2015-019493

(51) Int. Cl.
*G06T 11/60* (2006.01)
*G06F 3/0482* (2013.01)
(Continued)

(52) U.S. Cl.
CPC ............ *G06T 11/60* (2013.01); *G06F 3/0482* (2013.01); *G06F 3/04845* (2013.01); *G06T 5/40* (2013.01);
(Continued)

(58) Field of Classification Search
CPC ......... G06T 5/40; G06T 11/60; G06F 3/0482; G06F 3/04845; H04N 1/407
(Continued)

(56) References Cited

U.S. PATENT DOCUMENTS

2006/0017855 A1    1/2006 Yamada
2006/0274936 A1*  12/2006 Ohkubo ............ G06K 9/00234
                                                                    382/167
(Continued)

FOREIGN PATENT DOCUMENTS

CN        1735129 A       2/2006
JP        2006-093757     4/2006
(Continued)

OTHER PUBLICATIONS

International Search Report in International Pat. Appl. No. PCT/JP2015/000945, dated Apr. 28, 2015.
(Continued)

*Primary Examiner* — King Y Poon
*Assistant Examiner* — Vincent Peren
(74) *Attorney, Agent, or Firm* — Greenblum & Bernstein, P.L.C.

(57) ABSTRACT

GUI of an image processing device according to the present invention is a control window which receives a change of an input parameter of spatial tone correction processing and receives an operation of changing five input parameters. In GUI, first input parameters such as a correction method, correction strength, a degree of color enhancement, brightness, and a correction range can be set. The correction
(Continued)

method is selected through pull-down menu, and any one or a plurality of methods can be selected from four correction methods such as contrast enhancement, backlight correction, dark-portion correction, and bright-portion correction. The correction strength, degree of color enhancement, brightness, and correction range are designated through slide-bars of which values are respectively set by a user moving sliders within the window in a transverse direction. Value displays display designated values of the correction strength, the degree of color enhancement, the brightness, and the correction range.

12 Claims, 14 Drawing Sheets

(51) Int. Cl.
    *G06F 3/0484*     (2013.01)
    *G06T 5/40*     (2006.01)
    *H04N 1/407*     (2006.01)

(52) U.S. Cl.
    CPC ......... *H04N 1/407* (2013.01); *G06T 2200/24* (2013.01); *G06T 2207/10024* (2013.01)

(58) Field of Classification Search
    USPC .......................................................... 345/594
    See application file for complete search history.

(56) References Cited

U.S. PATENT DOCUMENTS

| | | | |
|---|---|---|---|
| 2007/0036456 A1* | 2/2007 | Hooper | G06T 5/20 382/274 |
| 2011/0129148 A1* | 6/2011 | Kisilev | G06T 5/009 382/167 |
| 2012/0301042 A1 | 11/2012 | Komatsu et al. | |

FOREIGN PATENT DOCUMENTS

| | | |
|---|---|---|
| JP | 2008-092052 | 4/2008 |
| JP | 2011-171807 A | 9/2011 |

OTHER PUBLICATIONS

English Translation of Chinese Search Report dated May 24, 2018 for the related Chinese Patent Application No. 201580009962.6.

\* cited by examiner

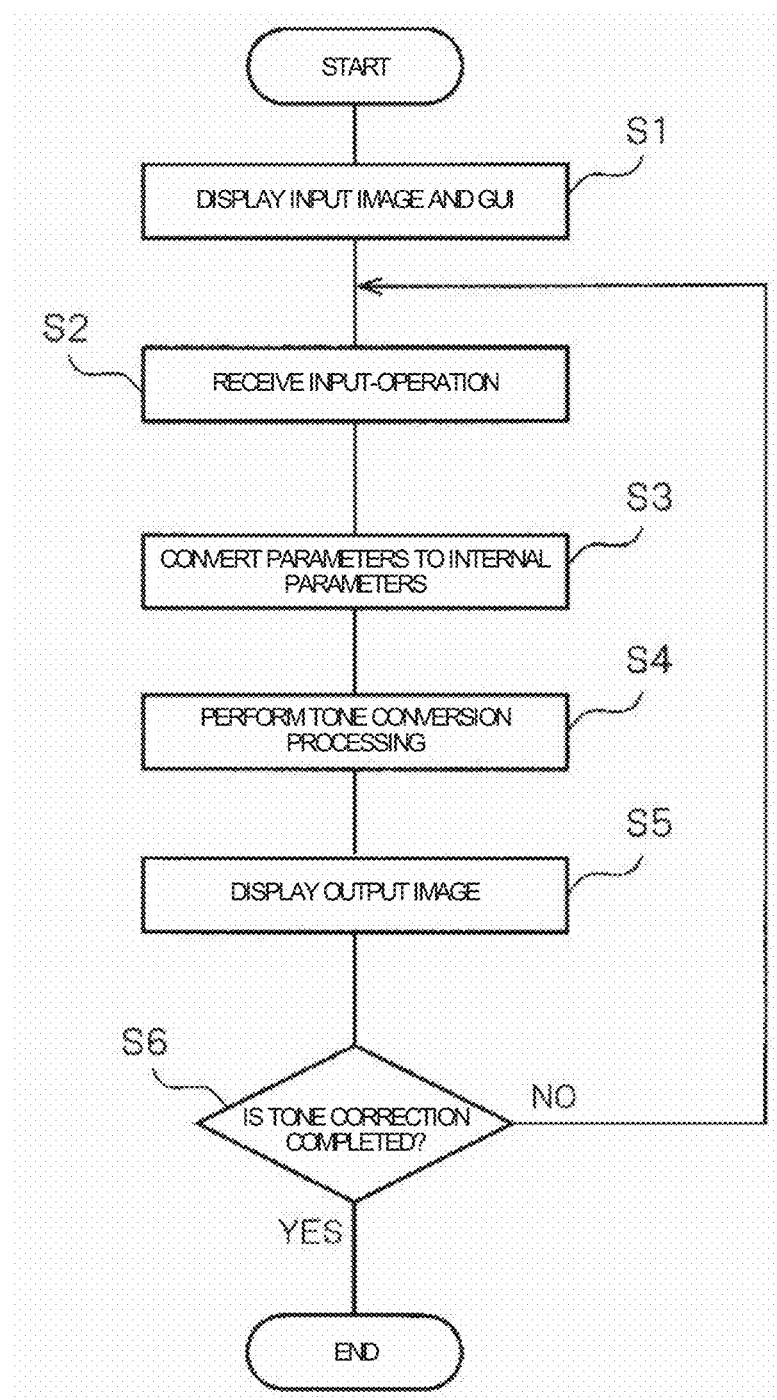

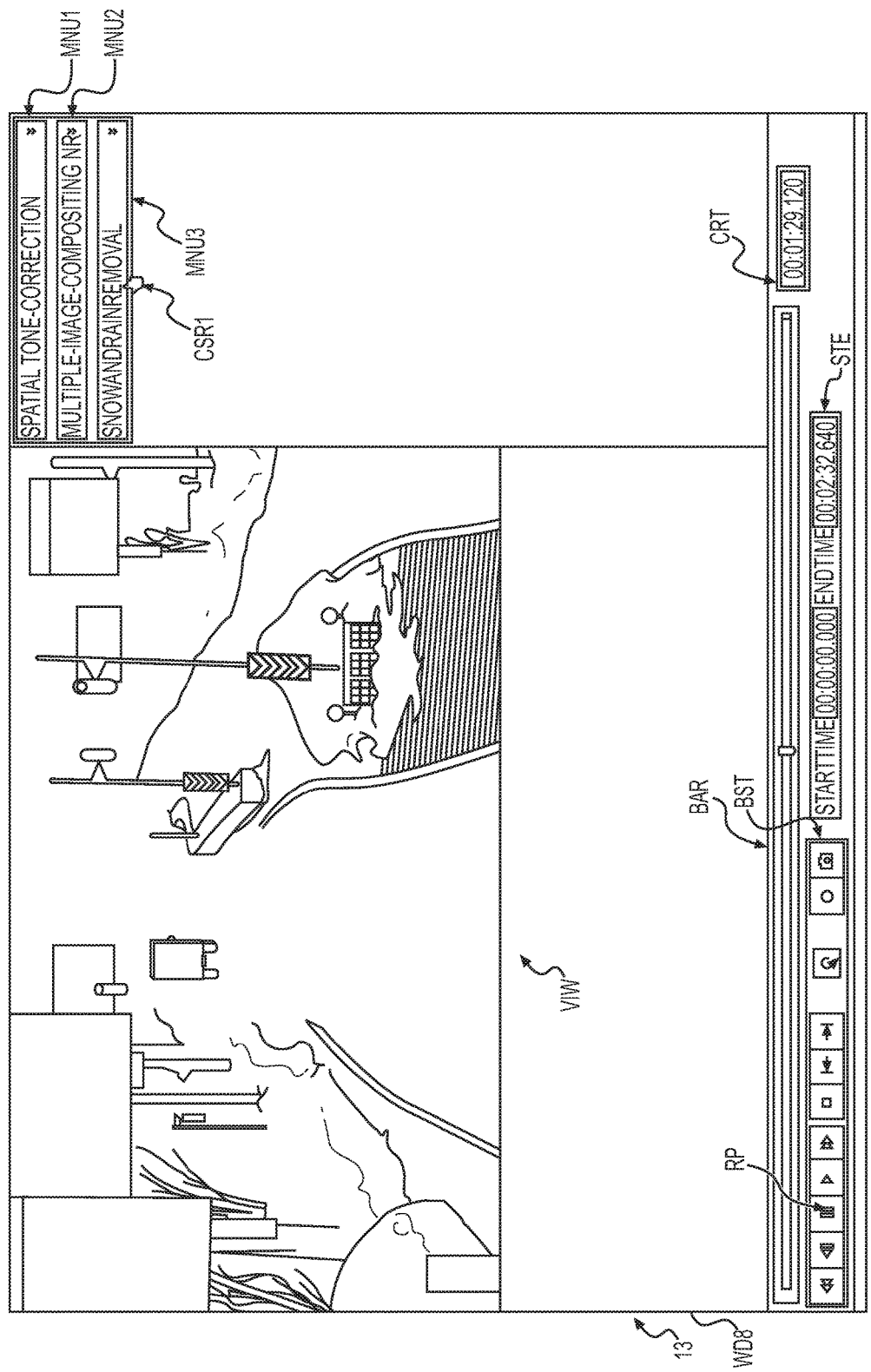

IMAGE PROCESSING DEVICE AND IMAGE PROCESSING METHOD WHICH PROCESS AN IMAGE BASED ON HISTOGRAM DATA IN THE IMAGE

TECHNICAL FIELD

The present invention relates an image processing device which performs image processing based on histogram data in image data for each tone, and an image processing method.

BACKGROUND ART

There are cases where an area of high brightness (brightness area) and an area of low brightness (dark area) are mixedly present within image data imaged by an imaging device such as a camera. For example, when an area having the bright outside due to sunlight and an area having the dark inside are included, a sufficient difference of light and shade between the brightness area and the dark area. However, there is a problem in that contrast is not uniformly set within the areas and an imaging subject is not vivid.

In consideration of such a problem, there is a known technology in which histogram data indicating tone distribution of pixels present within a local area centering around a certain observation point, on an image is generated, a tone conversion curve (a tone curve) enhancing the contrast of the tone of a high degree in the histogram data is obtained, and tone correction processing is performed by applying the tone conversion curve, that is, the tone correction processing performed through a so-called local histogram equalization method. Accordingly, the contrast is enhanced in each area of the brightness area and the dark area, and a vivid image can be obtained.

Incidentally, when the tone correction processing by the local histogram equalization method is performed on the basis of a pixel unit with respect to an entire image, a massive computation amount is required, and thus, the method is not practically suitable for the purpose of an application for image processing in daily use.

There is a known technology in which the tone correction processing is performed by dividing image data into multiple blocks, counting a representative value of each block included in a local area centering around each block, generating histogram data of each block, and obtaining the tone conversion curve based on the histogram data (for example, refer to PTL 1). According to an image processing device disclosed in PTL 1, the computation amount can be reduced.

CITATION LIST

Patent Literature

PTL 1: Japanese Patent. Unexamined Publication No. 2008-92052

SUMMARY OF THE INVENTION

However, when tone correction processing disclosed in PTL 1 is performed, there are many types of parameters required in the tone correction processing and contents of each parameter are also difficult to understand. Therefore, there has been a problem in that it is not easy for a user to perform the tone correction processing unless the user is skilled in the tone correction processing.

In order to solve the above-described problems in the related art, the present invention aims to provide an image processing device in which even a user not skilled in tone correction processing simply and efficiently performs the tone correction processing, and an image processing method.

According to the present invention, there is provided an image processing device having image data. The image processing device includes a display that displays an operation screen of a first input parameter related to tone correction processing; a convertor that converts a changed first input parameter into a second input parameter related to the tone correction processing in response to an operation of changing the first input parameter performed on the operation screen; and an image processor that performs the tone correction processing of the image data by applying the second input parameter.

In this configuration, the display displays the operation screen of the first input parameter related to the tone correction processing. The convertor converts the changed first input parameter into the second input parameter related to the tone correction processing in response to the operation of changing the first input parameter performed on the operation screen. The image processor performs the tone correction processing of the image data by applying the second input parameter.

Accordingly, the image processing device displays the operation screen of the first input parameter which can be relatively and easily understood by even a user not skilled in the tone correction processing; can convert the first input parameter into the second input parameter which is difficult for a user not skilled in the tone correction processing to understand, in response to the operation of changing the first input parameter performed on the operation screen; and can simply and efficiently perform the tone correction processing since the tone correction processing is performed by applying the second input parameter.

According to the present invention, there is provided an image processing method of an image processing device having image data. The image processing method includes a step of displaying an operation screen of a first input parameter related to tone correction processing; a step of receiving an operation of changing the first input parameter performed on the operation screen; a step of converting a changed first input parameter into a second input parameter related to the tone correction processing in response to the operation of changing the first input parameter; and a step of performing the tone correction processing of the image data by applying the second input parameter.

In this method, the display displays the operation screen of the first input parameter related to the tone correction processing. The changed first input parameter is converted into the second input parameter related to the tone correction processing in response to the operation of changing the first input parameter performed on the operation screen. The tone correction processing of the image data is performed by applying the second input parameter.

Accordingly, the image processing device displays the operation screen of the first input parameter which can be relatively and easily understood by even a user not skilled in the tone correction processing; can convert the first input parameter into the second input parameter which is difficult for a user not skilled in the tone correction processing to understand, in response to the operation of changing the first input parameter performed on the operation screen; and can simply and efficiently perform the tone correction processing since the tone correction processing is performed by applying the second input parameter.

According to the present invention, even a user not skilled in the tone correction processing can efficiently perform the tone correction processing.

BRIEF DESCRIPTION OF DRAWINGS

FIG. 6 is a flowchart describing an operation procedure of tone correction processing of the image processing device, according to the present exemplary embodiment.

FIG. 14 is a view illustrating a display example in which the display area of the viewer of a video image and the display area of each image processing menu are displayed on the same screen showing a video image after being subjected to each type of the image processing such as spatial tone correction, multiple-image compositing NR, and snow and rain removal.

DESCRIPTION OF EMBODIMENT

Hereinafter, an exemplary embodiment (hereinafter, referred to as "the present exemplary embodiment") of an image processing device and an image processing method according to the present invention will be described with reference to the drawings. The image processing device of the present exemplary embodiment is an electronic device in which image data imaged by an imaging device such as a camera is input or stored and which can be configured by adopting a personal computer (PC), for example. However, the image processing device of the present exemplary embodiment is not limited to the PC. Hereinafter, image data which is input or stored in the image processing device will be referred, to as "input-image data".

Moreover, the present invention is not limited to the image processing device and the image processing method and may be expressed as a program for causing a computer to execute an operation regulated by the image processing method, or a computer readable recording medium in which the program for causing a computer to execute an operation regulated by the image processing method is recorded.

Figure 1:
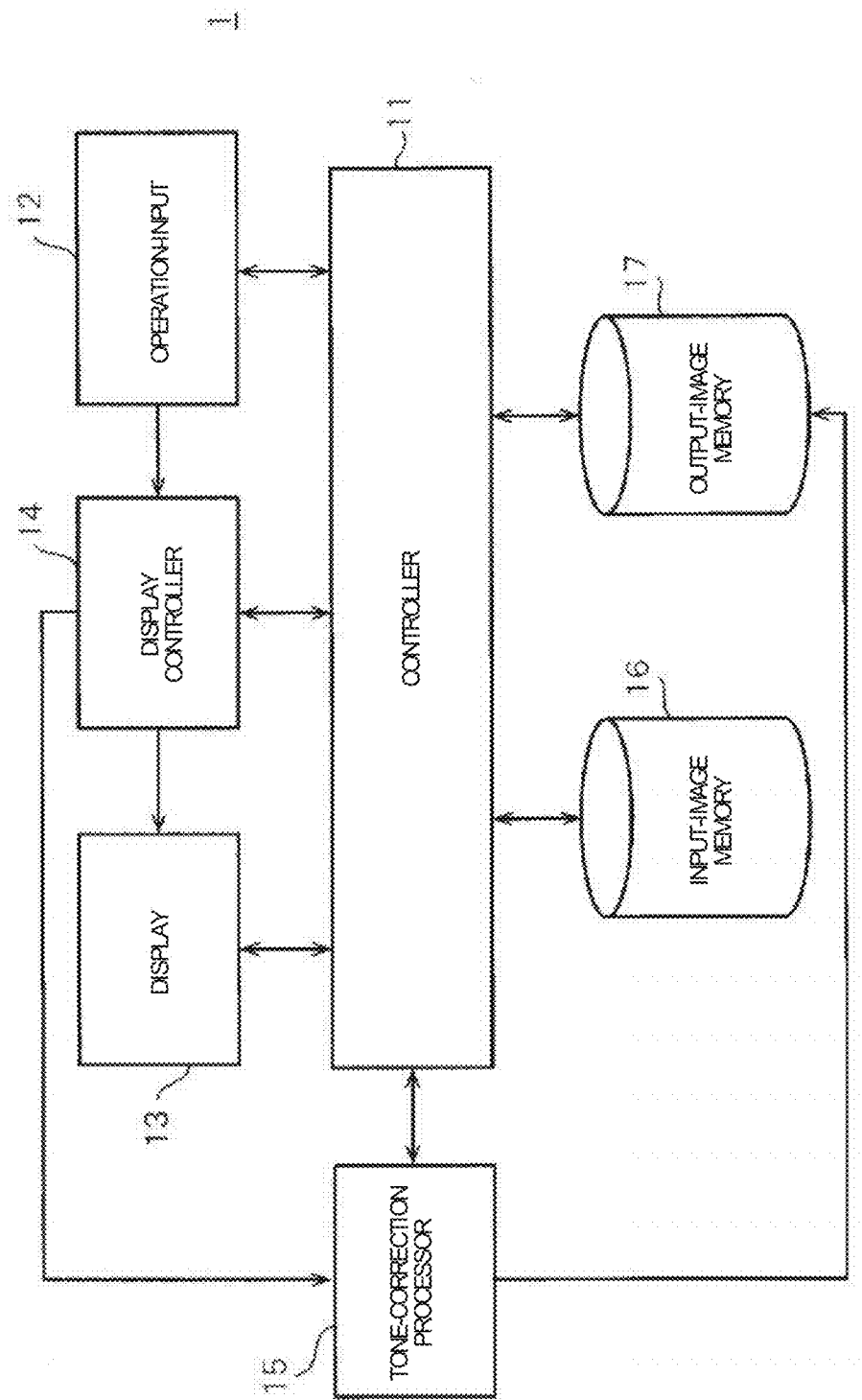
FIG. 1 is a block diagram illustrating an internal configuration of an image processing device, according to the present exemplary embodiment.

FIG. 1 is a block diagram illustrating an internal configuration of image processing device 1, according to the present exemplary embodiment. Image processing device 1 illustrated in FIG. 1 has controller 11, operation-input 12, display 13, display controller 14, tone-correction processor 15, input-image memory 16, and output-image memory 17.

For example, controller 11 is configured by adopting a central processing unit (CPU), a read only memory (ROM), and a random access memory (RAM), and generally controls operations of each unit of image processing device 1. As a processor configuring controller 11, a micro processing unit (MPU) or a digital signal processor (DSP) may be used, other than the CPU.

Operation-input 12 is an input device such as a mouse and a keyboard with which a user can perform an input-operation.

Display 13 is a monitor which displays various types of information and data on a screen. A touch panel configured to have operation-input 12 and display 13 which are integrally formed may be applied.

Display controller 14 controls a graphical user interface (GUI), receives an input-operation performed by a user through operation-input 12, and controls the screen display of display 13.

Tone correction processor 15 performs spatial tone correction processing (hereinafter, simply referred to as "the tone correction processing") by inputting input-image data, and outputs output-image data obtained as a processing result of the tone correction processing. The details of tone-correction processor 15 will be described later.

For example, input-image memory 16 is configured by adopting a RAM or a flash memory, and stores input-image data.

For example, output-image memory 17 is configured by adopting a RAM or a flash memory, and stores output-image data obtained through the tone correction processing.

Figure 2:
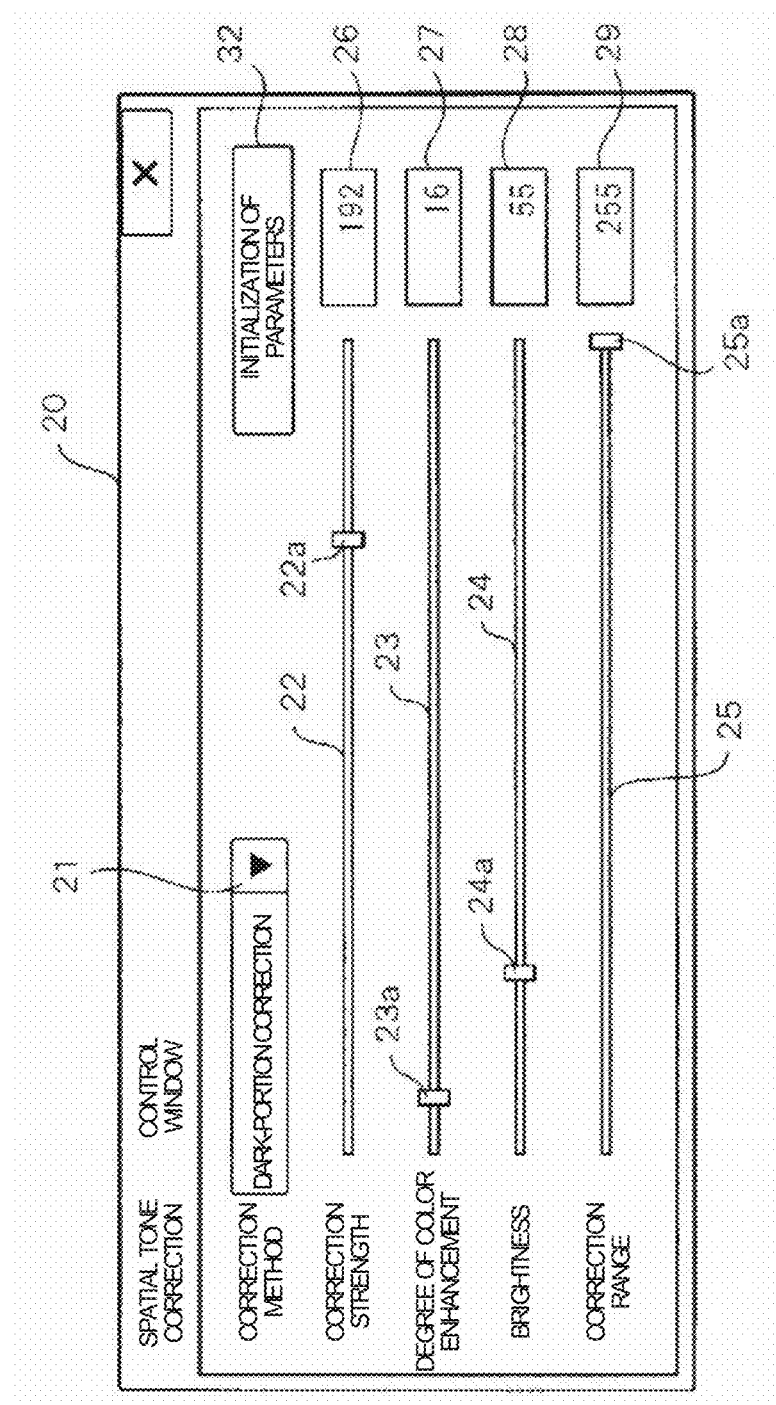
FIG. 2 is a view illustrating a GUI which is an operation screen displayed by a display.

FIG. 2 is a view illustrating GUI 20 which is an operation screen displayed by display 13. GUI 20 serving as the operation screen is a control window which receives a change of an input, parameter (a first input parameter) of the spatial tone correction processing and receives an operation of changing any one or multiple input parameters among five input parameters performed by a user. In the present exemplary embodiment, for example, as the five first input parameters, a correction method, correction strength, a degree of color enhancement, brightness, and a correction range can be set. The first input parameters are parameters which can be relatively and easily understood by even a user not skilled in the tone correction processing.

The correction method illustrated in FIG. 2 is selected by pull-down menu 21. In the present exemplary embodiment, four correction methods such as contrast enhancement, backlight correction, dark-portion correction, and bright-portion correction can be selected. In FIG. 2, for example, the correction method of the dark-portion correction is selected. In addition, the details of each correction method will be described later. In a case where the tone correction processing is not performed, "none" deployed by pull-down menu 21 may be selected.

The correction strength, the degree of color enhancement, the brightness, and the correction range illustrated in FIG. 2 are designated respectively by slide-bars 22, 23, 24, 25. When a user moves sliders 22a, 23a, 24a, 25a on slide-bars 22, 23, 24, 25 in the transverse direction, values of the first parameters are set.

Value displays 26, 27, 28, and 29 disposed on the right side of slide-bars 22, 23, 24, 25 respectively display designated values of the correction strength, the degree of color enhancement, the brightness, and the correction range. In FIG. 2, values of the correction strength, the degree of color enhancement, the brightness, and the correction range are respectively set to "192", "16", "55", and "255" while having the value 255 as the maximum value. In addition, the details of the correction strength, the degree of color enhancement, the brightness, and the correction range will be described later.

GUI 20 is provided with button 32 of "initialization of parameters" for returning all of the parameters to the initial values. When a user performs a pressing-operation of button 32, all of the parameters are set to the initial values. The initial value may be a value which is set in advance by a user, or may be set to the value 0, the value 255, or an intermediate value.

Figure 3:
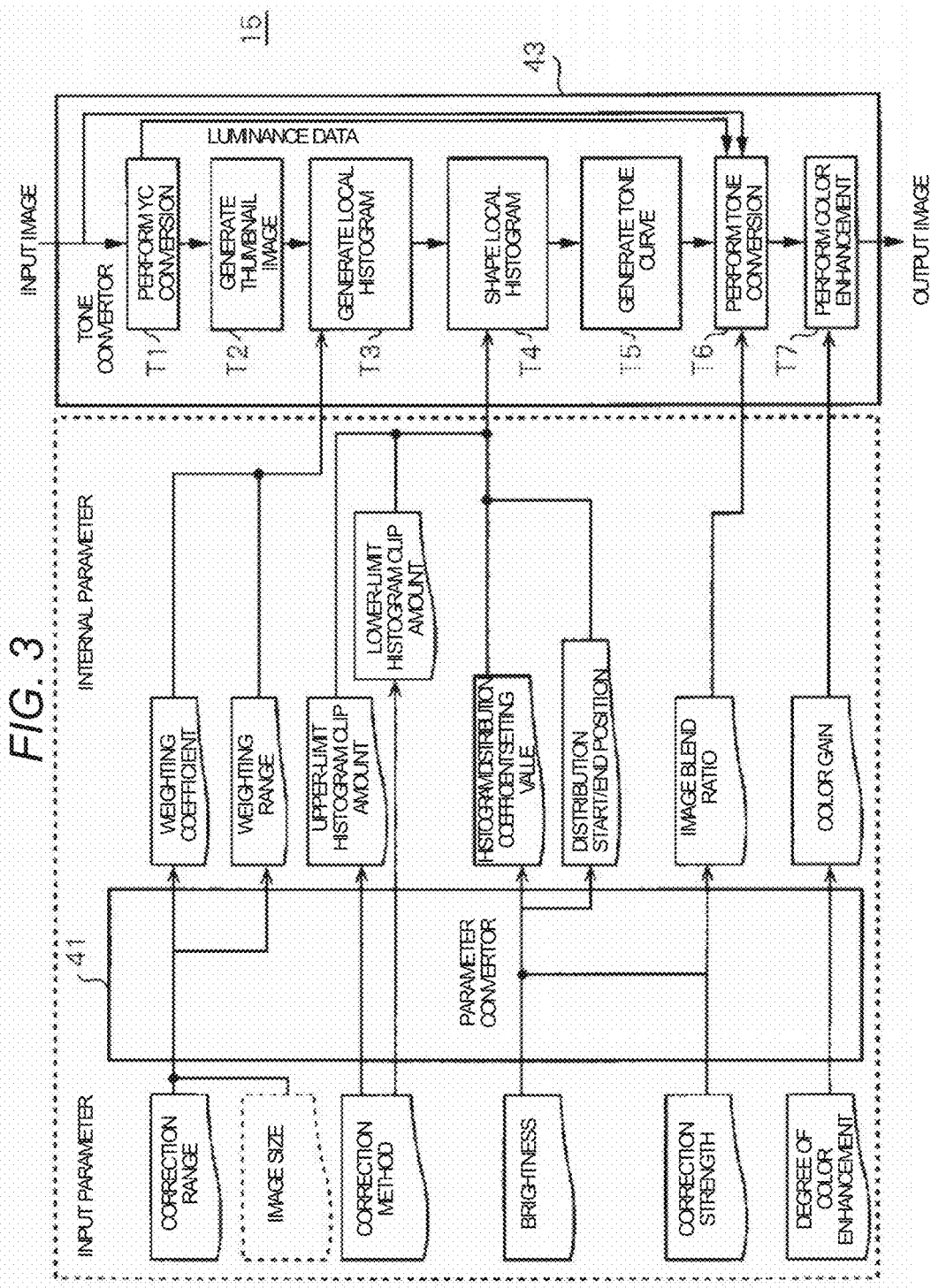
FIG. 3 is a view illustrating an example of a relationship between input parameters, a parameter convertor, and internal parameters; and an operation of a tone convertor.

FIG. 3 is a view illustrating an example of a relationship among the input parameters (the first input parameters), a parameter convertor, and internal parameters (second input parameters); and an operation of tone convertor 43.

Tone correction processor 15 illustrated in FIG. 3 is configured to include parameter convertor 41 which converts each of the five input parameters (the first input parameters) designated by a user through input-operations into the internal parameter (the second input parameter), and tone convertor 43 which performs the tone correction processing of input-image data by applying the internal parameters (the second input parameters) and outputs output-image data obtained through the tone correction processing. Here, the internal parameters (the second input parameters) are parameters difficult for a user not skilled in the tone correction processing to understand, and are parameters necessary to perform the tone correction processing. The details thereof will be described later.

When "the correction method" which is the input parameter (the first input parameter) is selected by a user through an input-operation, parameter convertor 41 sets "an upper-limit histogram clip amount" and "a lower-limit histogram clip amount" which are the internal parameters (the second input parameters) of 32 tones corresponding to the selected correction method by using a table (not illustrated) prepared in advance.

As described above, the correction method is the input parameter (the first input parameter) selected from any one of four methods such as the contrast enhancement, the backlight correction, the dark-portion correction, and the bright-portion correction. The contrast enhancement is the correction method selected in a case of raising the contrast of input-image data which is low due to the influence of cloudy weather or the like. The backlight correction is the correction method selected in a case of increasing a dynamic range which is insufficient due to halation, black defects, or the like. The dark-portion correction is the correction method selected in a case of making an image having many dark portions due to underexposure or the like bright. The bright-portion correction is the correction method selected in a case of making an image having many bright portions due to overexposure or the like dark.

The upper-limit histogram clip amount is an amount set to cut off a value equal to or greater than the upper-limit value in a case where a local histogram of a local area input-image data becomes equal to or greater than a predetermined upper limit (the upper-limit value). In addition, the lower-limit histogram clip amount is an amount set to raise a value equal to or less than the lower-limit value to the lower-limit, value in a case where a local histogram of a local area in input-image data becomes equal to or less than a predetermined lower limit (the lower-limit value). In this manner, the local histogram is shaped by setting the upper-limit histogram clip amount and the lower-limit histogram clip amount.

Parameter convertor 41 converts "brightness" which is the input parameter (the first input, parameter) into "a histogram distribution coefficient setting value" and "a distribution start/end position" which are the internal parameters (the second input parameters). The brightness is a parameter for moving a position of the center of gravity of the local histogram to a low-tone side or a high-tone side.

Parameter convertor 41 converts "the correction strength" which is the input parameter (the first input parameter) into "the histogram distribution coefficient setting value" and "an image blend ratio" which are the internal parameters (the second input parameters). The correction strength is a parameter for setting blend ratio $\alpha$ of output-image data and input-image data, and a distribution range (the number of tones subjected to distribution) with respect to the peripheral tone of the local histogram.

The histogram distribution coefficient setting value and the distribution start/end position sets a distribution range and a distribution rate (a weighting coefficient) when the local histogram is distributed. When the distribution rate is small and the distribution range is small, the degree of enhancement of the contrast of a corrected image is increased. When the distribution rate is significant and the distribution range is wide, the degree of enhancement of the contrast of a corrected image is relaxed.

In this manner, the histogram distribution coefficient setting value and the distribution start/end position are applied together with the upper-limit histogram clip amount and the lower-limit histogram clip amount when the local histogram is shaped.

The image blend ratio is blend ratio $\alpha$ (0 to 1) of a corrected image with respect to an input image. An output image is obtained by adding input image X $(1-\alpha)$ and corrected image X$\alpha$. Accordingly, when blend ratio $\alpha$ increases, the ratio of using a corrected image (output-image data) increases.

Parameter convertor 41 converts "the degree of color enhancement" which is the input parameter (the first input parameter) into "a color gain" which is the internal parameter (the second input parameter). The degree of color enhancement is a parameter for adjusting the degree of enhancement of color of an output image, and corresponds to the color gain.

Parameter convertor 41 generates "a weighting coefficient" and "a weighting range" which are the internal parameters (the second input parameters) by applying "the correction range" which is the input parameter (the first input parameter), and "an image size" of the input-image data.

Figure 4:
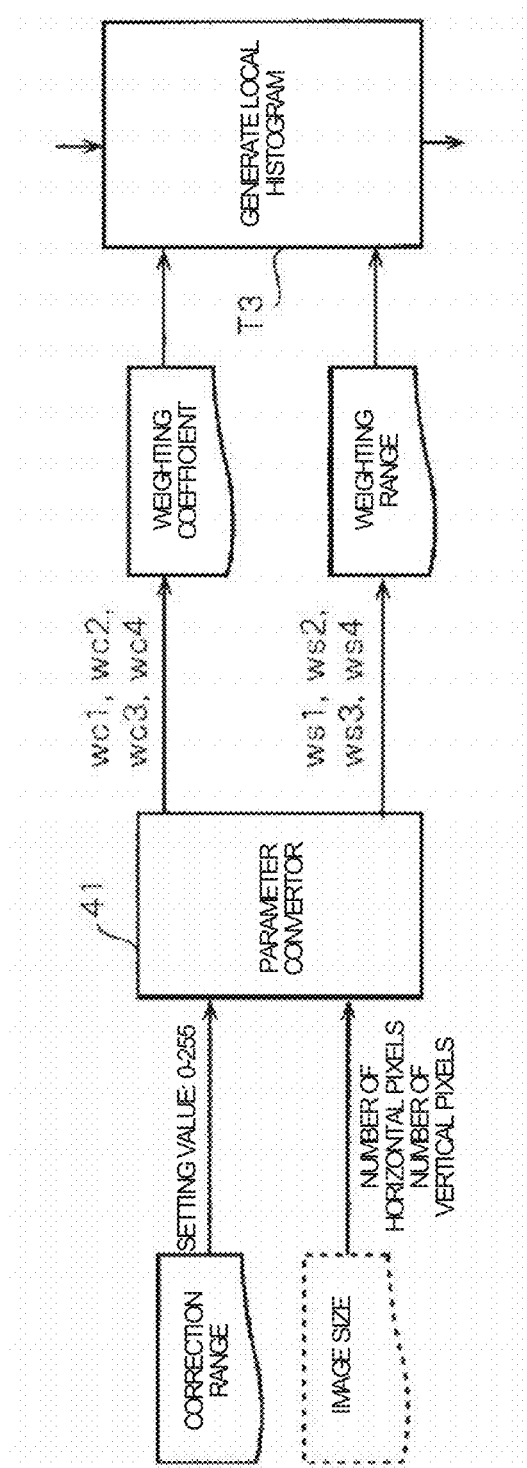
FIG. 4 is a view describing a procedure of local histogram generation processing in a case where a correction range is changed.

FIG. 4 is a view describing a procedure of local histogram generation processing in a case where the correction range is changed. Here, the correction range is a parameter for setting a range in which the local histogram is generated. The image size is a size expressed by the number of horizontal pixels and the number of vertical pixels in an input image. When the correction range is changed within a range of the values 0 to 255, parameter convertor 41 generates the weighting range and the weighting coefficient. The generated weighting range and the generated weighting coefficient are applied to the processing of the local histogram generation (Step T3 illustrated in FIG. 3) described below. In parameter convertor 41, four weighting ranges ws1, ws2, ws3, and ws4 and four weighting coefficients wc1, wc2, wc3, and wc4 are generated.

Figure 5A:
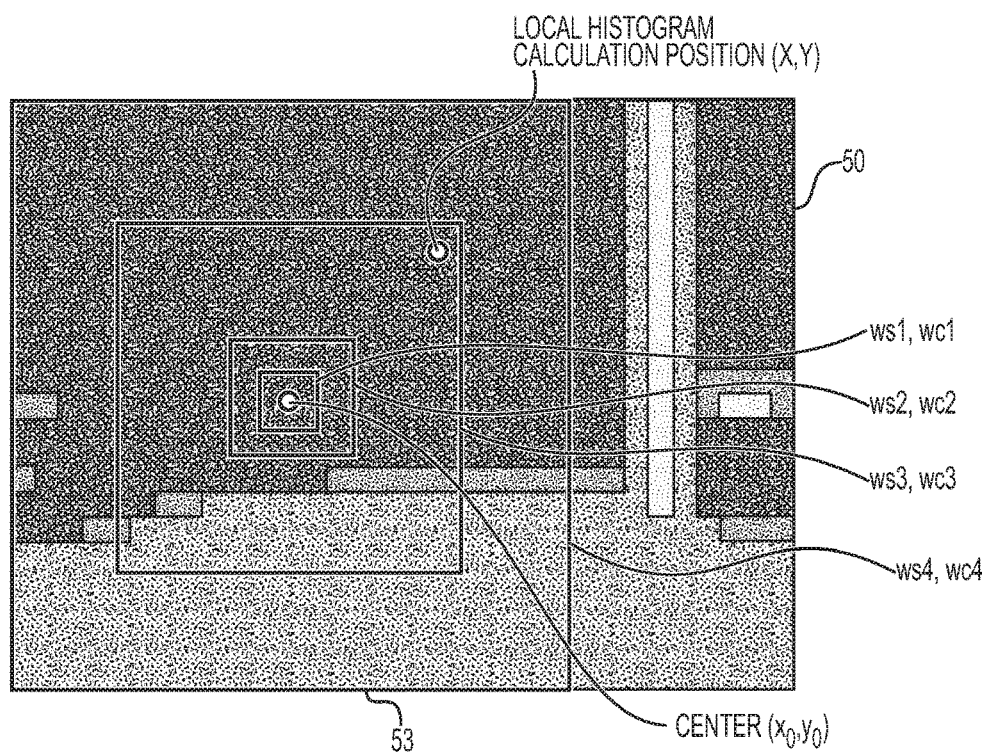
FIG. 5A is a view illustrating the correction range set in a thumbnail image.
Figure 5B:
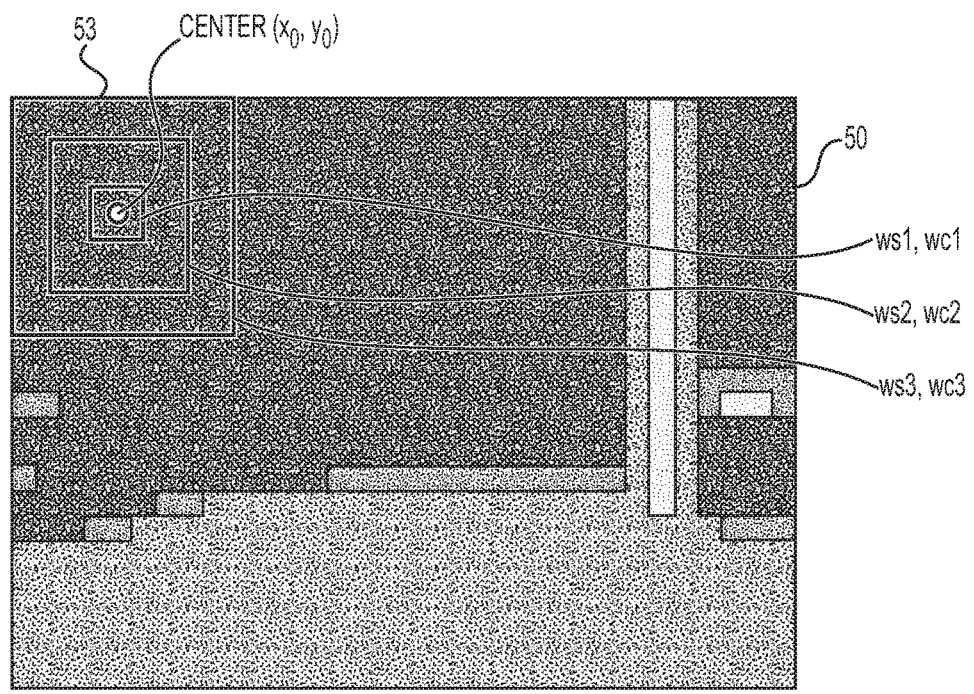
FIG. 5B is a view illustrating another correction range net in the thumbnail image.

FIGS. 5A and 5B are views illustrating correction ranges 53 set in thumbnail image 50. Thumbnail image 50 is a reduced image of which the input-image data is converted such that pixels of 8×8 form one block. In FIGS. 5A and 5B, four weighting ranges ws1, ws2, ws3, and ws4 are set in accordance with distances from the center ($x_0$, $y_0$) of correction range 53 designated with respect to thumbnail image 50. Moreover, weighting coefficients wc1, wc2, wc3, and wc4 are respectively set to four weighting ranges ws1, ws2, ws3, and ws4. The weighting range and the weighting coefficient are examples and can be appropriately changed.

When the local histogram is generated, in a case where a local histogram calculation position (x, y) is within weighting range ws3, the number of elements within weighting range ws3 is counted by being added weighting coefficient wc3 times. Similarly, in a case where the local histogram calculation position is within weighting range ws2, the number of elements within weighting range ws2 is counted by being added weighting coefficient wc2 times. Accordingly, as the distance from the center of correction range 53 is lengthened, the influence to generation of the local histogram can be reduced. All of the numbers of elements within the correction range may be uniformly added without performing weighting.

In addition, as illustrated in FIG. 5A, in a case where correction range 53 is set to be significant, the local histogram is calculated so as to have a wide range on thumbnail image 50. As a result, a tone curve is optimized in the entire image.

Meanwhile, as illustrated in FIG. 5B, in a case where correction range 53 is set to be small, the local histogram is calculated so as to have a narrow range on thumbnail image 50. As a result, the tone curve is optimized locally.

Subsequently, tone convertor 43 which is an example of the image processor will be described with reference to FIG. 3.

As described above, tone convertor 43 performs the tone correction processing of input-image data by applying the internal parameter (the second input parameter), and outputs output-image data obtained as the tone correction processing result.

Specifically, in FIG. 3, tone convertor 43 performs YC conversion in which input-image data is divided into brightness (luminance) and color difference (T1), and generates a thumbnail image having pixels of 8×8 as one block (T2). Here, one block includes pixels of 8×8. However, in order to reduce the computation amount, a section having more pixels such as pixels of 16×16 may form one block. Tone convertor 43 generates a local histogram by applying the weighting range and the weighting coefficient which are the internal parameters (the second input parameters), with respect to the thumbnail image (T3).

Tone convertor 43 shapes the local histogram by applying the upper-limit histogram clip amount, the lower-limit histogram clip amount, the histogram distribution coefficient setting value, and the distribution start/end position which are the internal parameters (the second input parameters) (T4). Tone convertor 43 generates the tone curve (the tone conversion curve) from the shaped histogram (T5).

Tone convertor 43 performs tone conversion of an input image by applying the generated tone curve, the image blend ratio which is the internal parameter (the second input parameter), and luminance data obtained in Step T1 (T6). Tone convertor 43 performs color enhancement by applying the color gain which is the internal parameter with respect to the input image after being subjected to the tone conversion (T7), thereby obtaining output-image data.

An operation of the tone correction processing of image processing device 1 having the above-described configuration will be described with reference to FIG. 6. FIG. 6 is a flowchart describing an operation procedure of the tone correction processing of image processing device 1, according to the present exemplary embodiment.

In FIG. 6, display controller 14 causes display 13 to display input-image data stored in input-image memory 16 and GUI 20 which is the operation screen (S1). Operation-input 12 receives an input-operation of a user performed in GUI 20 displayed by display 13 (S2).

Tone correction processor 15 converts five parameters of GUI 20 set through input-operations into the internal parameters (S3). Moreover, tone-correction processor 15 performs the tone correction processing of the input-image data (refer to FIG. 3) by applying the converted internal parameters (S4). Tone correction processor 15 stores the output-image data obtained through the tone correction processing in output-image memory 17 (S5). In addition, display controller 14 causes display 13 to display the output-image data stored in output-image memory 17.

Thereafter, display controller 14 determines whether or not there is an input of completing the tone correction processing performed through operation-input 12 (S6). In a case where there is no input of completing the tone correction processing (S6, NO), the procedure returns to the processing of Step S2, and a similar operation is repeated. Meanwhile, in a case where there is an input of completing the tone correction processing, the present operation ends.

As described above, image processing device 1 of the present exemplary embodiment receives an operation of changing the input parameter (the first input parameter) performed by a user based on an operation of pull-down menu 21 and slide-bars 22 to 25 included in GUI 20 displayed by display 13. Image processing device 1 converts any one or multiple input parameters (the first input parameters) into the internal parameter (the second input parameter) in response to a change-operation performed by a user. Moreover, image processing device 1 performs the tone correction processing locally or entirely with respect to input-image data by applying the internal parameters (the second input parameters) in response to simple operations of changing the input parameters (the first input parameters), thereby causing display 13 to display the output-image data. In a case where a user sees the output-image data displayed by display 13 and determines that the result of the local tone correction processing is not favorable, the user can repeat the operations of changing the input parameters (the first input parameters) as many times as the user wishes.

Accordingly, in image processing device 1 of the present exemplary embodiment, even a user who does not know the contents of the parameters difficult to understand, such as the internal parameters (the second input parameters) can simply perform the tone correction processing in response to the operations of changing the five input parameters (the first input parameters) including the correction method, the correction strength, the degree of color enhancement, the brightness, and the correction range which are relatively easy to understand.

In other words, image processing device 1 allows even a user not skilled in the tone correction processing to simply and efficiently perform the tone correction processing of the input-image data through simple operations of changing the input parameters (the first input parameters) of GUI 20 (the operation screen) displayed by display 13.

In addition, in image processing device 1 of the present exemplary embodiment, image data of a video image and a menu screen of the spatial tone correction read out from input-image memory 16 may be displayed on the same screen in display 13 (refer to FIGS. 7 to 14). Hereinafter, examples of the screens respectively displayed on same screens WD1 to WD8 in display 13 will be described with reference to FIGS. 7 to 14.

Figure 7:
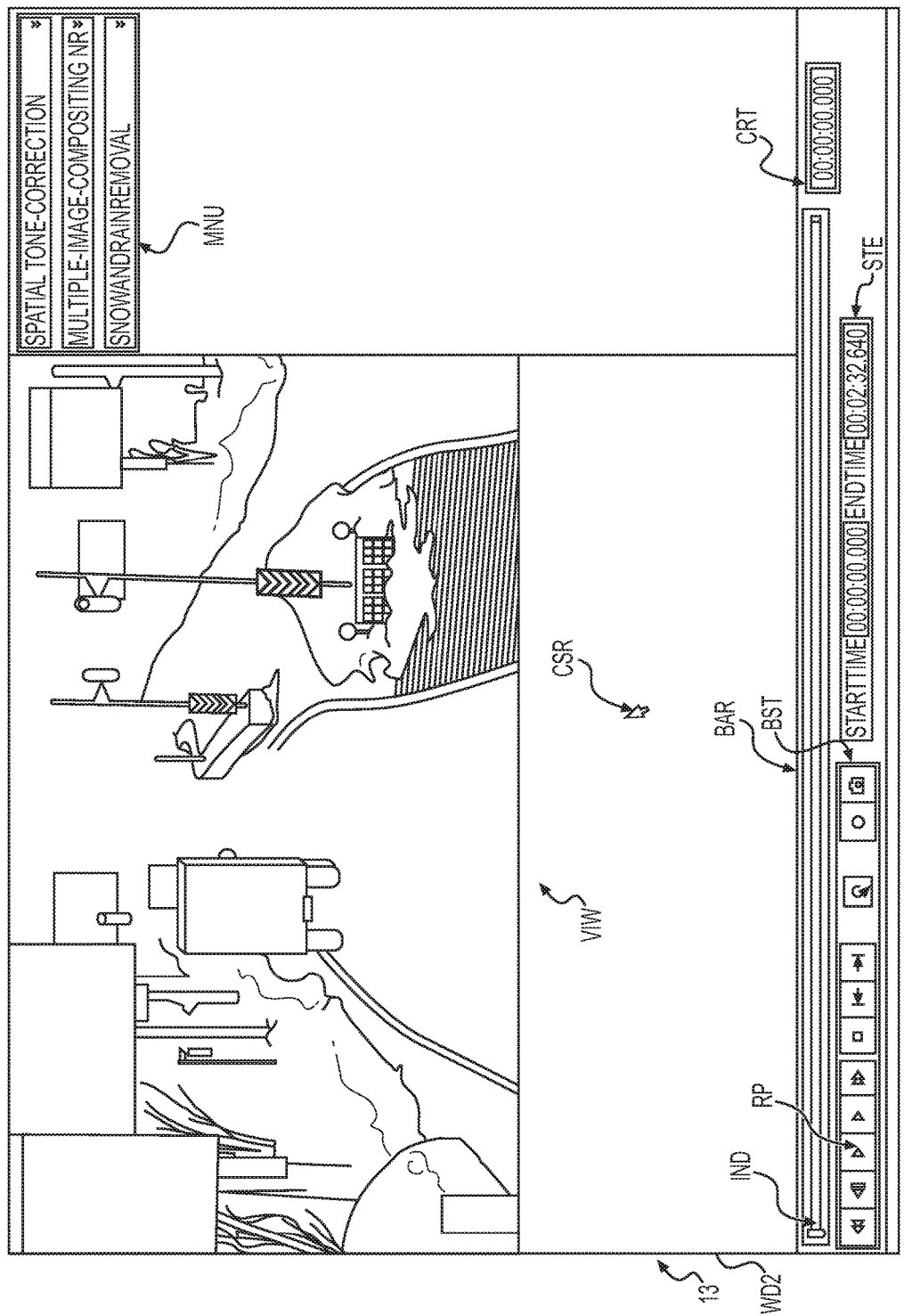
FIG. 7 is a view illustrating a display example in which a display area of a viewer of a video image and a display area of an image processing menu are displayed on the same screen showing a video image immediately before being reproduced.
Figure 8:
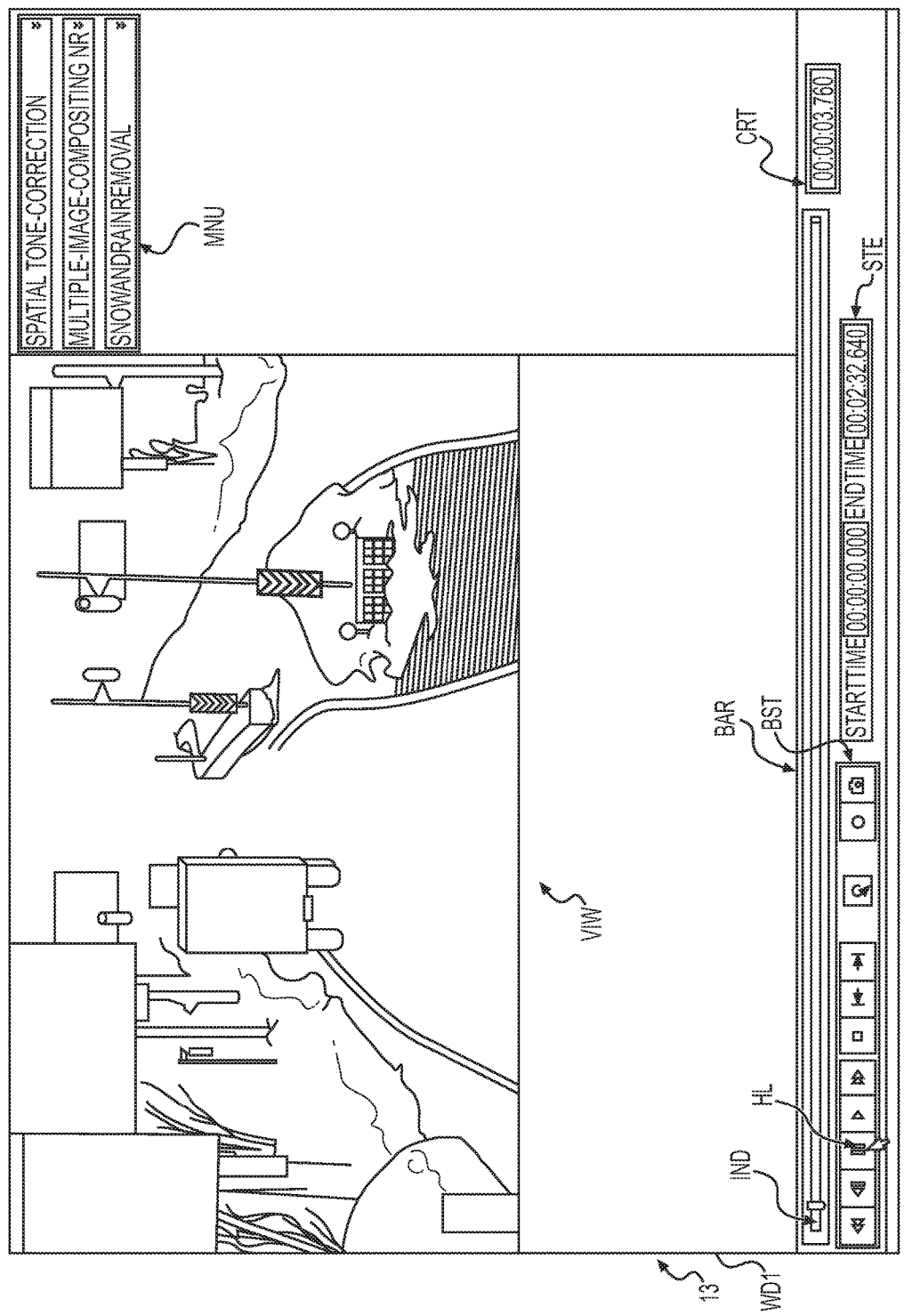
FIG. 8 is a view illustrating a display example in which the display area of the viewer of a video image and the display area of the image processing menu are displayed on the same screen showing a video image immediately after being reproduced.
Figure 9:
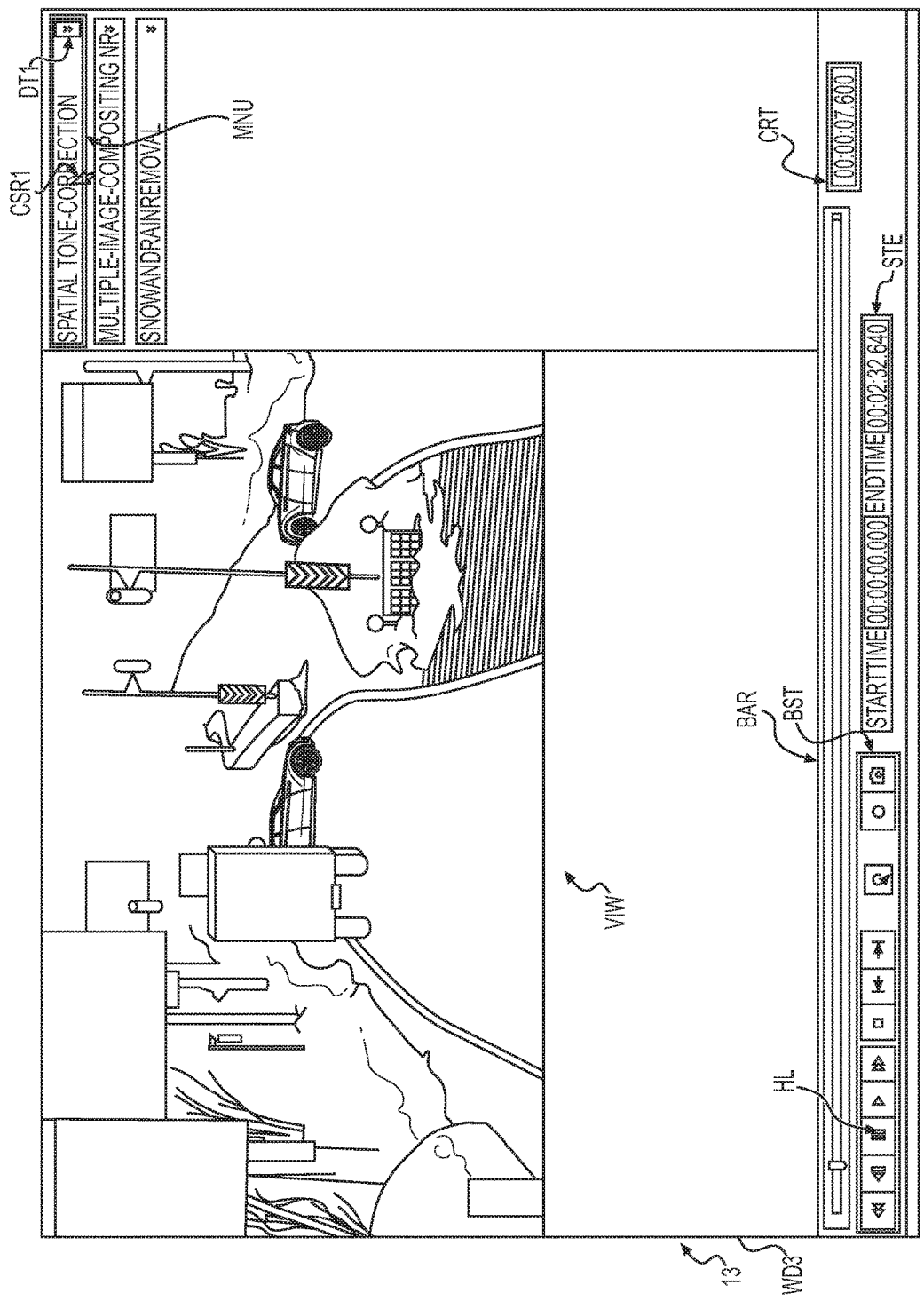
FIG. 9 is a view illustrating a display example in which the display area of the viewer of a video image and the display area of the image processing menu are displayed on the same screen showing a video image after being subjected to spatial tone correction.

FIG. 7 is a view illustrating a display example in which display area VIW of a viewer of a video image and display area MNU of an image processing menu are displayed on same screen WD1 showing a video image immediately before being reproduced. FIG. 8 is a view illustrating a display example in which display area VIW of the viewer of a video image and display area MNU of the image processing menu are displayed on same screen WD2 showing a video image immediately after being reproduced. FIG. 9 is a view illustrating a display example in which display area VIW of the viewer of a video image and display area MNU of the image processing menu are displayed on same screen WD3 showing a video image after being subjected to the spatial tone correction.

In FIG. 7, display area VIW of the viewer of the image data of the video image when being read out from input-image memory 16 in a state immediately before being reproduced, and display area MNU of the menu (the image processing menu) of the image processing (specifically, the spatial tone correction, the multiple-image compositing noise reduction (NR), and the snow and rain removal) which can be executed by image processing device 1 are shown on same screen WD1. In FIG. 7, detailed contents of each image processing menu are not shown, and only the name of each image processing menu is shown. Therefore, it is possible for a user to visually recognize a relationship between the image data of the video image which becomes a target of the image processing in image processing device 1, and the list of the menu of the image processing which can be executed by image processing device 1, at a glance. Accordingly, it is possible for a user to contrastively check the image data of the video image which becomes a target of the image processing and the image processing menu.

At the bottom portion of screens WD1 to WD8 illustrated in FIGS. 7 to 14, operation button set BST related to operations such as reproduce, pause, stop, fast-forward, rewind, record, and reverse of a video image; reproduction bar BAR visually showing a reproduction time of a video image; video image time area STE showing a start time and an end time of a video image; and reproduction time area CRT directly showing an actual reproduction time (that is, an elapsed time from the start time) indicated by indicator IND displayed within reproduction bar BAR are displayed together. When a user performs an operation in which reproduce button RP is pressed by cursor CSR, controller 11 of image processing device 1 reproduces the image data of the video image read out from input-image memory 16 (refer to FIG. 8). In this case, controller 11 of image processing device 1 performs displaying on screen WD2 by changing reproduce button RP to pause button HL.

Here, when a user performs an operation in which menu bar MNU1 of the spatial tone correction in display area MNU of the image processing menu is pressed once by cursor CSR, for example, tone-correction processor 15 of image processing device 1 performs the spatial tone correction with respect to the image data of the video image displayed in display area VIW in accordance with a corresponding method of the above-described exemplary embodiment (for example, refer to FIG. 6). Meanwhile, when menu bar MNU1 of the spatial tone correction is pressed once again by cursor CSR, tone-correction processor 15 of image processing device 1 stops the spatial tone correction with respect to the image data of the video image displayed in display area VIW. Accordingly, image processing device 1 can unerringly execute or stop executing the image processing corresponding to any image processing menu displayed in display area MNU through a simple operation of a user (that is, the presence or absence of pressing menu bar MNU1) in a state where the image data of the video image displayed in display area VIW is reproduced, and thus, it is possible for a user to simply check the processing result before and after the image processing. In a case where cursor CSR is on any menu bar of the image processing menu or in the vicinity thereof, controller 11 of image processing device 1 may display cursor CSR1 having a different shape or may display original cursor CSR.

In addition, when a user performs an operation in which marker DT1 displayed at the right end portion of menu bar MNU1 of the spatial tone correction illustrated in FIG. 9 is pressed by cursor CSR1, controller 11 of image processing device 1 deploys display area MNU1D of a detailed operation screen for setting multiple input parameters related to the spatial tone correction and displays the same on screen WD4 (refer to FIGS. 10 to 13). FIGS. 10 to 13 are views respectively illustrating examples in each of which display area VIW of the viewer of a video image and display area MNU1D of the image processing menu are displayed on each of same screens WD4 to WD7 showing details of the spatial tone correction menu.

As illustrated in FIGS. 10 to 13, controller 11 of image processing device 1 causes display area MNU ID to display a screen similar to the detailed operation screen (refer to FIG. 2) for setting the input parameters related to the spatial tone correction. In display area MNU1D illustrated in FIGS. 10 to 13, checkbox ATC (refer to FIG. 13) for automatic setting in which the correction method, the correction strength, the degree of color enhancement, the brightness, and the correction range (the input parameters related to the spatial tone correction) are respectively set to predetermined values in advance is additionally displayed. The predetermined values of the correction method, the correction strength, the degree of color enhancement, the brightness, and the correction range at the time of automatic setting are not limited to the initial values. For example, the predetermined values may be dynamically set based on a result of the image processing of tone-correction processor 15, and the rest is the same as above. Illustration of button 32 of "initialization of parameters" for returning all of the input parameters to the initial values is omitted in FIGS. 10 to 13.

Similarly in FIGS. 10 to 13, when a user performs an operation in which cursor CSR is moved to the right and left, with respect to seek bar SKB (refer to sliders 22a, 23a, 24a, and 25a illustrated in FIG. 2) provided for each of the correction strength, the degree of color enhancement, the brightness, and the correction range, image processing device 1 performs the spatial tone correction by applying the internal parameters changed in accordance with the input parameters after the moving operation, with respect to the image data of the video image currently being reproduced in display area VIW.

In addition, when a user inputs the values (for example, values within a range from 0 to 255) with respect to entry field IPF (refer to value displays 26, 27, 28, and 29 illustrated in FIG. 2) provided for each of the correction strength, the degree of color enhancement, the brightness, and the correction range, image processing device 1 performs the spatial tone correction by applying the internal parameters changed in accordance with the input parameters which have been input, with respect to the image data of the video image currently being reproduced in display area VIW.

Figure 10:
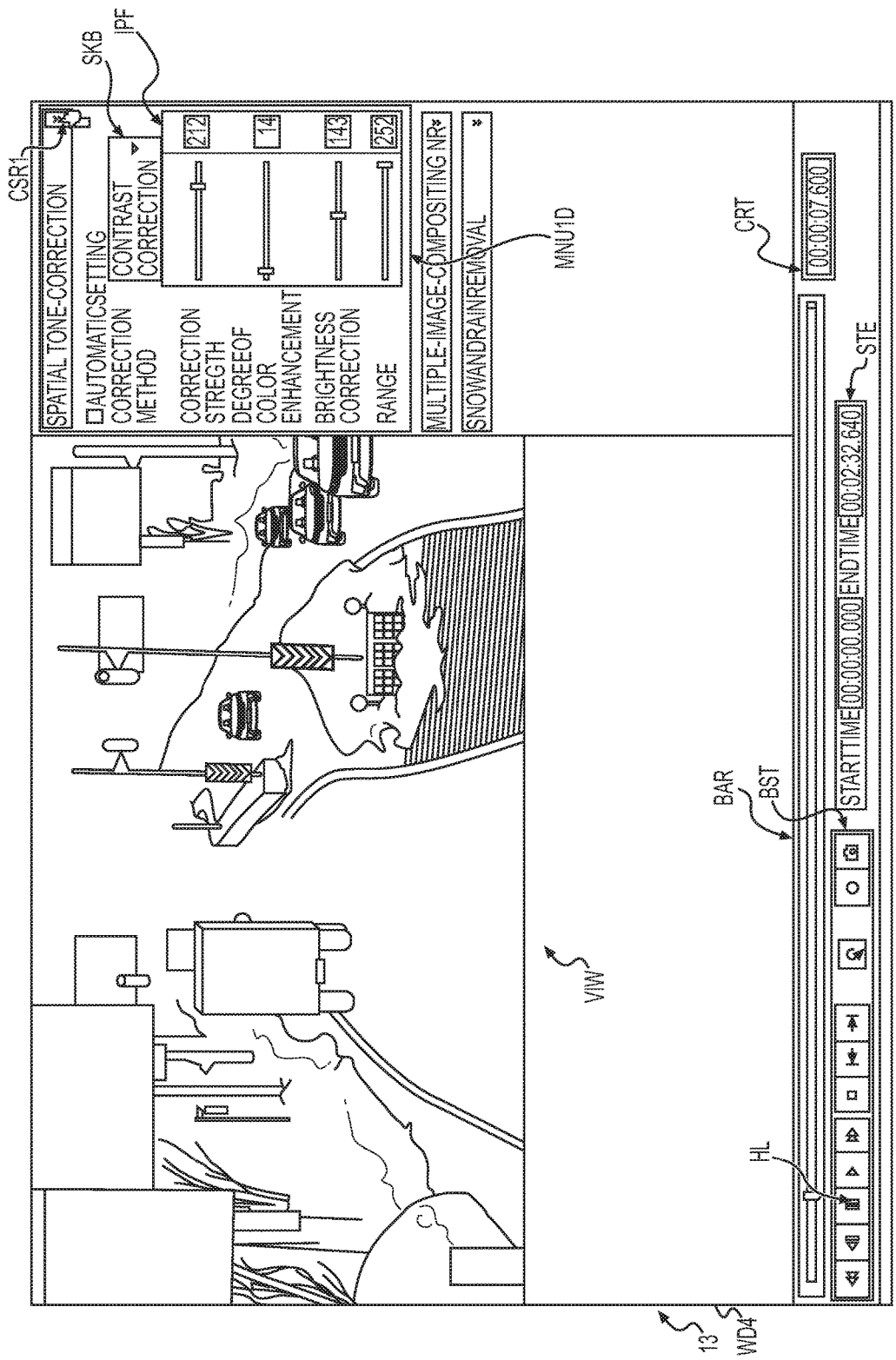
FIG. 10 is a view illustrating an example in which the display area of the viewer of a video image and the display area of the image processing menu are displayed on the same screen showing details of a spatial tone correction menu.
Figure 11:
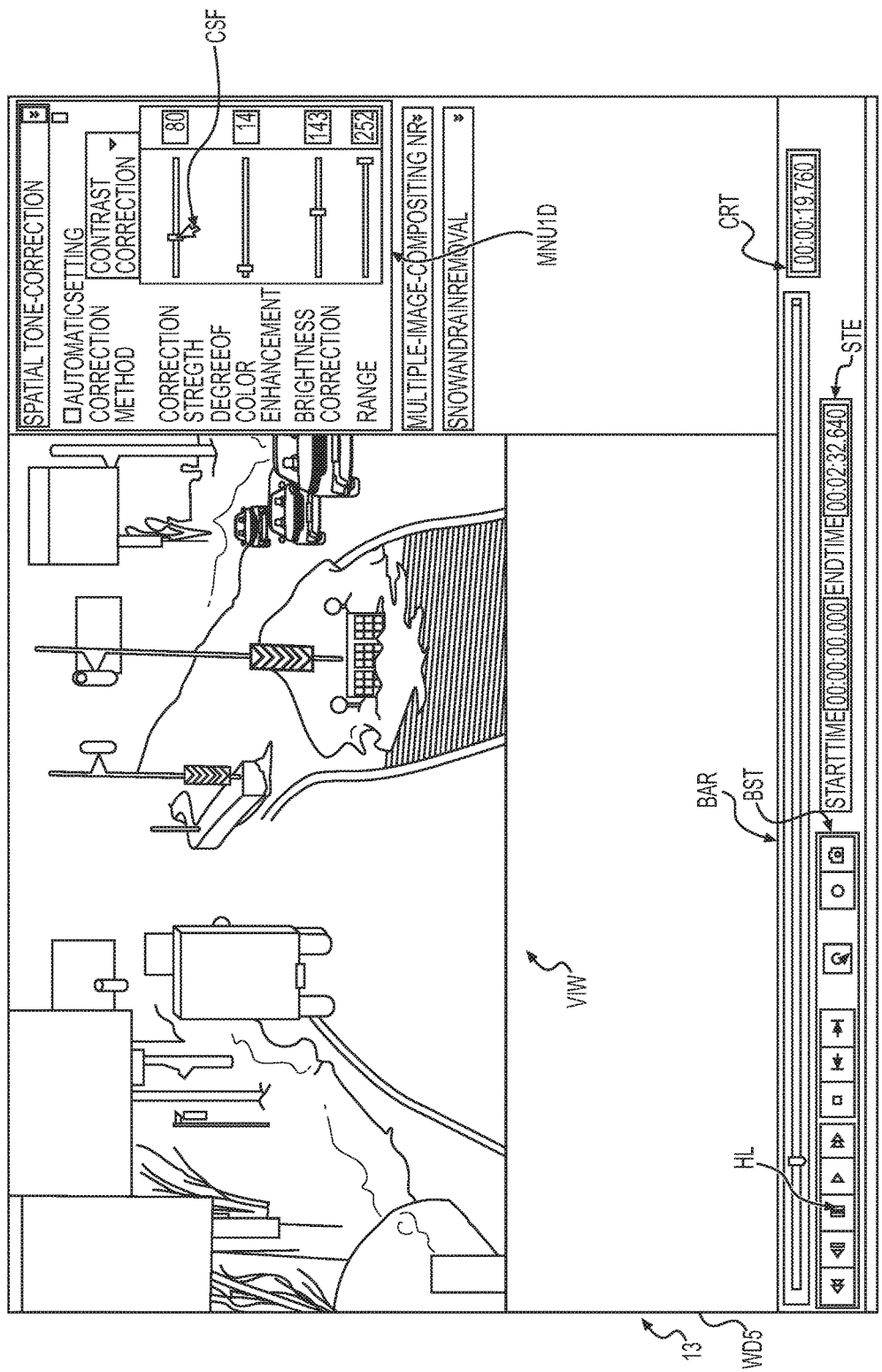
FIG. 11 is a view illustrating an example in which the display area of theviewer of a video image and the display area of the image processing menu are displayed on the same screen showing details of the spatial tone correction menu.

In FIG. 10, the correction strength indicates "212", and the correction strength is changed to "80" in FIG. 11. Accordingly, the degree of vividness of the image data of the video image illustrated in FIG. 10 deteriorates compared to the degree of vividness of the image data of the video image illustrated in FIG. 11. However, a burden of the processing in image processing device 1 can be reduced, and a user can sufficiently grasp the contents of the video image.

Figure 12:
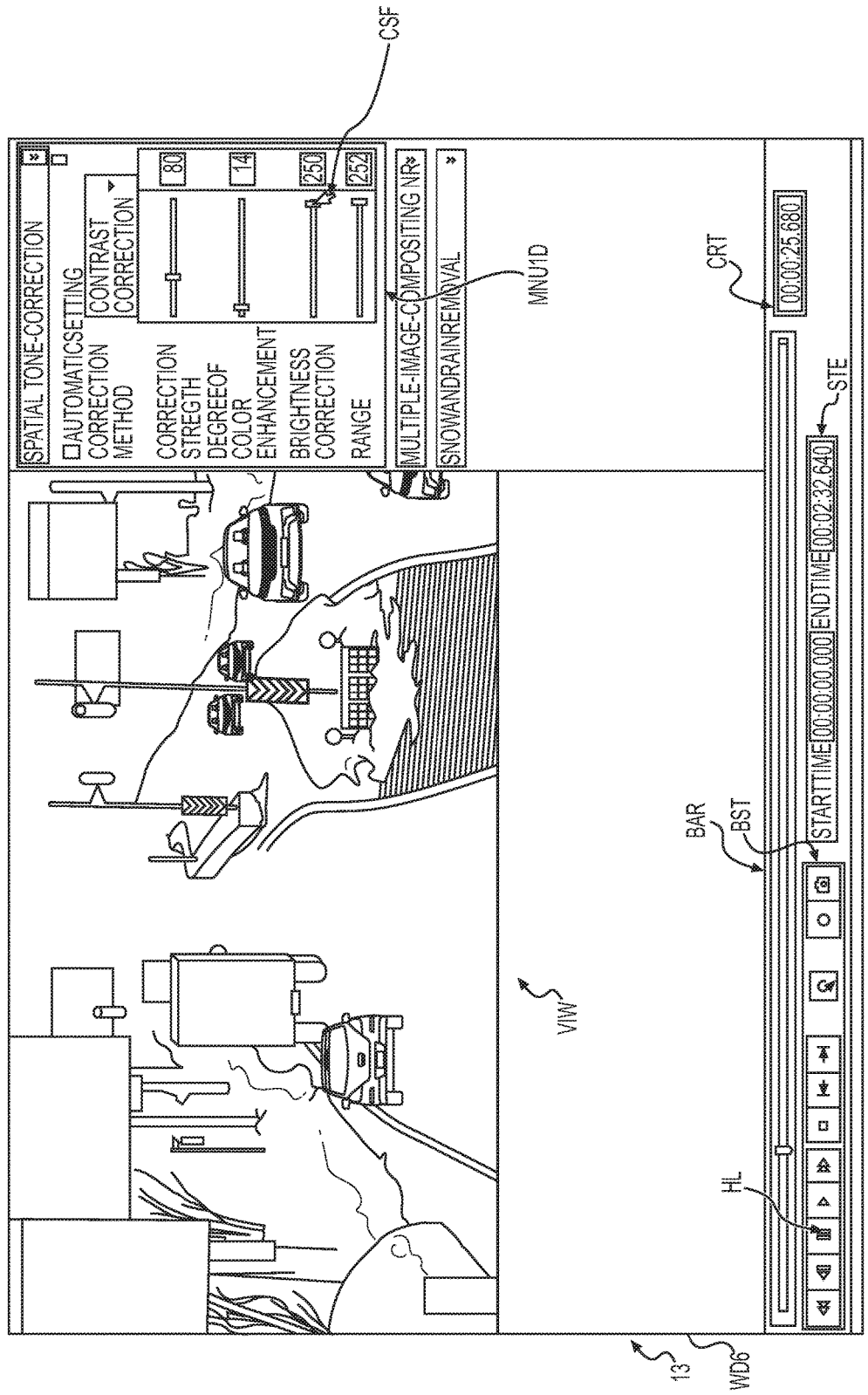
FIG. 12 is a view illustrating an example in which the display area of the viewer of a video image and the display area of the image processing menu are displayed on the same screen showing details of the spatial tone correction menu.

The brightness indicates "143" in FIG. 10, and the brightness is changed to "250" in FIG. 12. Accordingly, the image data of the video image illustrated in FIG. 12 is increased in brightness compared to the image data of the video image illustrated in FIG. 10. Therefore, even though the degree of vividness of the image data in an operation illustrated in FIG. 10 deteriorates (that is, the contrast is low), a burden of the processing in image processing device 1 regarding "the contrast, correction" of the correction method can be reduced, and a user can sufficiently grasp the contents of the video image.

Figure 13:
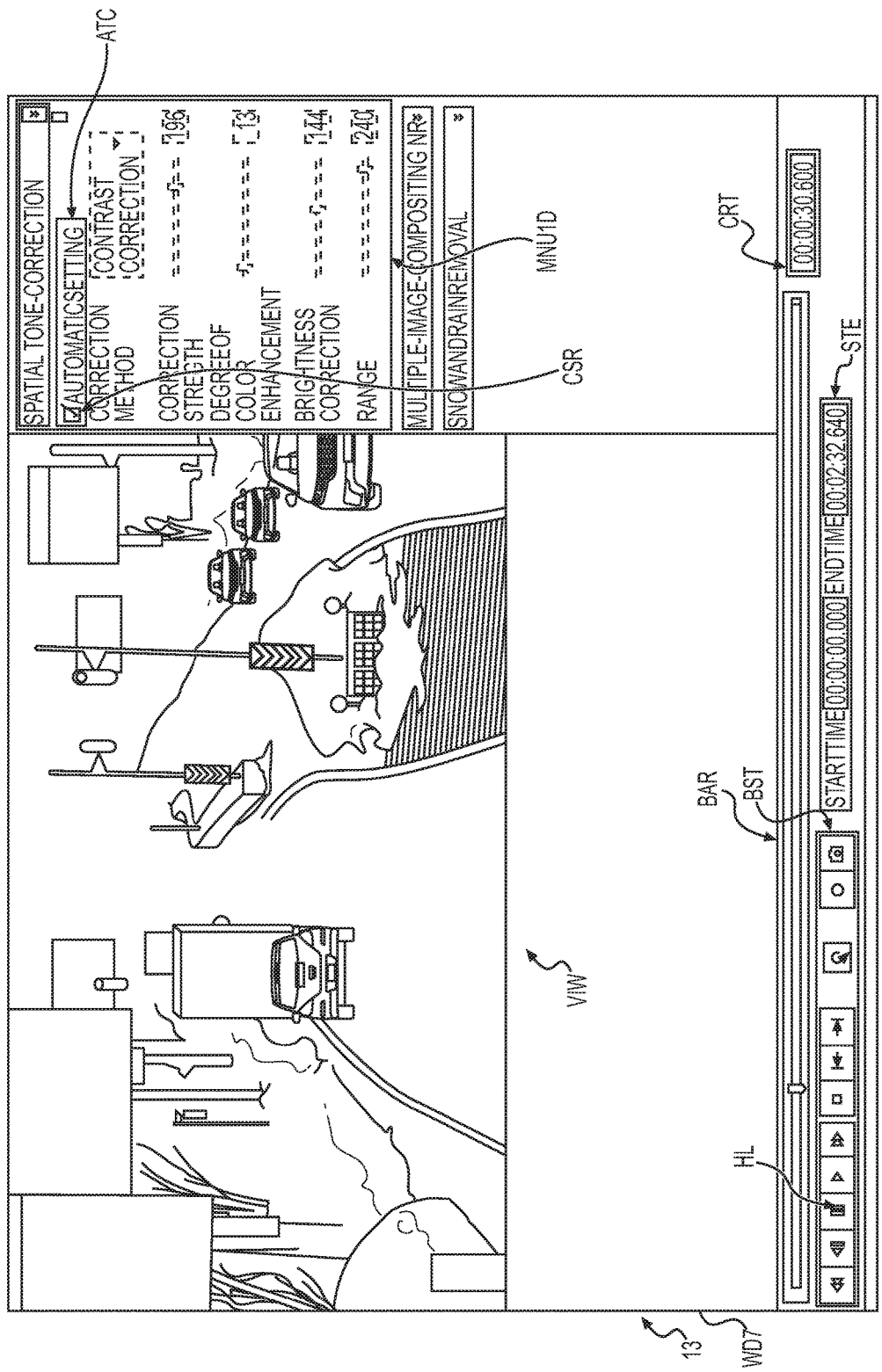
FIG. 13 is a view illustrating an example in which the display area of the viewer of a video image and the display area of the image processing menu are displayed on the same screen showing details of the spatial tone correction menu.

In addition, when a user performs an operation in which checkbox ATC for automatically setting the input parameters related to the spatial tone correction illustrated in FIG. 13 to default values (for example, the initial values) for each of the input parameters is pressed by cursor CSR, image processing device 1 performs the spatial tone correction by applying the internal parameters converted by applying the default values for each of the input parameters, with respect to the image data of the video image currently being reproduced in display area VIW. Accordingly, image processing device 1 allows even a user, who does not know which values are to be input as the input parameters related to the spatial tone correction, to simply perform the spatial tone correction with respect to the image data of the video image b applying typical initial values as the default values at the time of the spatial tone correction, for example.

In addition, in image processing device 1 of the present exemplary embodiment, the image data of the video image read out from input-image memory 16 and the menu screen of the multiple types of the image processing including the spatial tone correction may be displayed on the same screen in display 13 (refer to FIG. 14). Hereinafter, examples of the screens respectively displayed on same screens WD8 to WD10 in display 13 will be described with reference to FIG. 14.

FIG. 14 is a view illustrating a display example in which display area VIM of the viewer of a video image and each of display areas MNU1, and MNU3 of the image processing menu are displayed on same screen WD8 showing a video image after being subjected to each type of the image processing such as the spatial tone correction, the multiple-image compositing NR, and the snow and rain removal. In FIG. 14, a user performs an operation in which each of menu bar MNU1 of the spatial tone correction, menu bar MNU2 of the multiple-image compositing NR, and menu bar MNU3 of the snow and rain removal is pressed by cursor CSR1, and the image data of the video image subjected to the image processing corresponding to each of the menu bars is displayed in display area VIW by image processing device 1. In other words, image processing device 1 of the present exemplary embodiment is not limited to the single-type image processing (for example, the spatial tone correction) described with reference to FIGS. 7 to 13. While the image data of the video image is displayed in display area VIW, multiple types of the image processing can be executed in response to a simple operation of a user. Thus, multiple types of image processing results can be intuitively and visually shown to a user.

The multiple-image compositing NR is image processing in which a noise component appearing in an image of a current frame is reduced by calculating the composite ratio of each image between the current frame and a frame which is input immediately before (a immediately-preceding frame) in accordance with the contrast of the image in the input frame (the current frame) and a motion-detecting level set in advance, and further performing compositing of the image in accordance with the composite ratio. In addition, the snow and rain removal is image processing in which an image at a corresponding position in an image after being subjected to filter processing or an image of a current frame is used as the image of the moving area in accordance with whether or not the moving area (that is, the area in motion) in an image of the input frame is greater than the designated size corresponding to a correction parameter for removing snow or rain.

In addition, in FIG. 14, similar to FIG. 10, a user performs an operation in which each of the markers of menu bar MNU1 of the spatial tone correction, menu bar MNU2 of the multiple-image compositing NR, and menu bar MNU3 of the snow and rain removal corresponding to marker DT1 illustrated in FIG. 9 is pressed by cursor CSR1, controller 11 of image processing device 1 deploys display area MNU1D and the like of the detailed operation screen for setting the multiple input parameters respectively related to the spatial tone correction, the multiple-image compositing NR, and the snow and rain removal and displays the same on the screen. The illustration of the display area of the detailed operation screen for setting the multiple input parameters respectively related to the multiple-image compositing NR and the snow and rain removal is omitted. For example, in the multiple-image compositing NR, a user performs an operation in which each of the parameter for designating the degree of reducing the noise by performing compositing of an image of the input frame and an image of the preceding frame (that is, the NR level), and the parameter for designating the above-described motion-detecting level set in advance, for example, the detection accuracy and the detection range of a camera in a case where image processing device 1 is a camera (that is, the detection accuracy and the detection range) is input or designated. In addition, in the snow and rain removal, the correction parameter (that is, the correction strength) for removing snow or rain is input or designated.

Accordingly, image processing device 1 can unerringly execute or stop executing the image processing corresponding to pressing-operations of the display areas MNU1, MNU2, and MNU3 through a simple operation of a user (that is, the presence or absence of pressing menu bars MNU1, MNU2, and MNU3 related to the multiple types of the image processing) in a state where the image data of the video image displayed in display area VIW is reproduced, and thus, it is possible for a user to simply check the processing result before and after the image processing. In addition, image processing device 1 can unerringly execute or stop executing the image processing in response to the operation of changing any of the parameters displayed in display areas MNU1D, MNU2D, and MNU3D of the detailed operation screen for setting each of the parameters in the multiple types of the image processing, and thus, it is possible for a user to simply check the processing result before and after the image processing.

Hereinbefore, various types of exemplary embodiments have been described with reference to the drawings. However, it is needless to mention that the present invention is not limited to the examples thereof. It is well understood by those skilled in the art that various changed examples and modification examples can be made within the scope disclosed in Claims. Naturally, the examples are considered to be included in the technical scope of the present invention.

For example, in the present exemplary embodiment, the tone curve (the tone conversion curve) applied to the entire input image is generated. However, a user may designate a desired processing area included in the input-image data, a tone curve with respect to the designated processing area may be generated, and the tone correction processing may be performed in only the processing area. Accordingly, it is possible to perform the tone correction processing for only a partial area included in the input image.

In addition, the present exemplary embodiment has been described regarding a case where the tone correction processing is performed when a user performs an operation of changing the input parameters through GUI 20. However, the tone correction processing may be performed without the change operation performed by a user. For example, tone convertor 43 within tone-correction processor 15 may determine the feature of the histogram (including the local histogram) and notify parameter convertor 41 of the determined result. Then, parameter convertor 41 may select the correction method corresponding to the shape of the histogram (including the local histogram).

INDUSTRIAL APPLICABILITY

The present invention is useful for an image processing device in which even a user not skilled in tone correction processing simply and efficiently performs the tone correction processing, and an image processing method.

REFERENCE MARKS IN THE DRAWINGS

1 IMAGE PROCESSING DEVICE
11 CONTROLLER
12 OPERATION-INPUT
13 DISPLAY
14 DISPLAY CONTROLLER
15 TONE-CORRECTION PROCESSOR
16 INPUT-IMAGE MEMORY
17 OUTPUT-IMAGE MEMORY
20 GUI
21 PULL-DOWN MENU
22, 23, 24, 25 SLIDE-BAR
22*a*, 23*a*, 24*a*, 25*a* SLIDER
26, 27, 28, 29 VALUE DISPLAY
41 PARAMETER CONVERTOR
43 TONE CONVERTOR
WD1, WD2, WD3, WD4, WD5, WD6, WD7, WD8 SCREEN

The invention claimed is:

1. An image processing device having image data, comprising:
 a display that displays the image data and an operation screen of a first input parameter related to tone correction processing;
 a convertor that converts a changed first input parameter into a second input parameter, which is different from the first input parameter, related to the tone correction processing in response to an operation of changing the first input parameter performed on the operation screen; and
 an image processor that performs the tone correction processing of the image data by applying the second input parameter after the changing of the first input parameter, wherein:
  the first input parameter sets at least one of, contrast enhancement, backlight correction, dark-portion correction, and bright-portion correction of the image data as a correction method,
  the second input parameter is modified based on the changed first input parameter,
  the convertor sets the second input parameter corresponding to the correction method,
  the image processor shapes a histogram data, which indicates tone distribution of pixels present within a local area of the image data, by using the set second input parameter,
  the local area centers around a certain point and has a certain range, and
  the first input parameter further sets a correction range as the range.

2. The image processing device of claim 1, wherein:
the display displays the image data and a menu bar of the tone correction processing on the same screen,
in response of a pressing of a marker displayed at the menu bar of the tone correction, the display displays the operation screen of the first input parameter, and
the image processor performs:
 the tone correction processing of the image data by applying the second input parameter, while the operation screen of the first input parameter and the image data are displayed on the same screen, and
 an executing or stop executing the tone correction processing by reproducing the image data in response to a pressing of the menu bar of the tone correction.

3. The image processing device of claim 2, wherein the display displays the image data and a menu screen of a plurality of types of image processing having the menu bar of the tone correction processing including the operation screen of the first input parameter on the same screen.

4. The image processing device of claim 1, wherein the correction range is defined corresponding to each correction method.

5. The image processing device of claim 1, wherein the second input parameter sets, corresponding to the correction method, an upper-limit histogram clip amount which is an amount set to cut off a value equal to or greater than the amount.

6. The image processing device of claim 1, wherein the second input parameter sets, corresponding to the correction method, a lower-limit histogram clip amount which is an amount set to cut off a value equal to or less than the amount.

7. The image processing device of claim 1, wherein:
the first input parameter sets a correction strength which sets an image blend ratio of an input image data to the image processor and an output image data from the image processor, and
the convertor sets the second input parameter corresponding to the correction strength.

8. The image processing device of claim 7, wherein the correction strength is defined corresponding to each correction method.

9. The image processing device of claim 7, wherein the convertor sets the second input parameter as the image blend ratio corresponding to the correction strength.

10. The image processing device of claim 1, wherein:
the first input parameter sets a degree of color enhancement which adjusts a degree of enhancement of color of an output image data from the image processor, and
the convertor converts the degree of color enhancement to a color gain as the second input parameter.

11. The image processing device of claim 10, wherein the degree of color enhancement is defined corresponding to each correction method.

12. An image processing method of an image processing device having image data, comprising:
displaying the image data and an operation screen of a first input parameter related to tone correction processing;
converting a changed first input parameter into a second input parameter, which is different from the first input parameter, related to the tone correction processing in response to an operation of changing the first input parameter performed on the operation screen; and
performing the tone correction processing of the image data by applying the second input parameter after the changing the first input parameter, wherein:
the first input parameter sets at least one of, contrast enhancement, backlight correction, dark-portion correction, and bright-portion correction of the image data as a correction method,
the second input parameter is modified based on the changed first input parameter,
the converting further comprises setting the second input parameter corresponding to the correction method,
the performing the tone correction further comprises shaping a histogram data, which indicates tone distribution of pixels present within a local area of the image data, by using the set second input parameter,
the local area centers around a certain point and has a certain range, and
the first input parameter further sets a correction range as the range.

* * * * *